(12) United States Patent
Park (10) Patent No.: US 10,019,160 B2
(45) Date of Patent: Jul. 10, 2018

(54) CONTROLLER AND DATA STORAGE DEVICE INCLUDING THE SAME (71) Applicant: SK hynix Inc., Gyeonggi-do (KR)

(72) Inventor: Young Jin Park, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 836 days.

(21) Appl. No.: 14/312,217

(22) Filed: Jun. 23, 2014

(65) Prior Publication Data

US 2015/0286410 A1   Oct. 8, 2015

(30) Foreign Application Priority Data

Apr. 8, 2014   (KR) .................. 10-2014-0041720

(51) Int. Cl.
*G06F 3/06* (2006.01)
(52) U.S. Cl.
CPC ............ *G06F 3/0604* (2013.01); *G06F 3/064* (2013.01); *G06F 3/0631* (2013.01); *G06F 3/0679* (2013.01); *G06F 3/0688* (2013.01)
(58) Field of Classification Search
CPC .......................... G06F 3/0604; G06F 3/0631
USPC .......................................................... 710/1
See application file for complete search history.

(56) References Cited

U.S. PATENT DOCUMENTS

| 6,061,777 A | * | 5/2000 | Cheong | G06F 9/3863 712/205 |
| 8,578,068 B2 | | 11/2013 | Blocksome et al. | |
| 8,588,228 B1 | * | 11/2013 | Onufryk | G06F 13/24 370/389 |
| 2004/0250000 A1 | * | 12/2004 | Jay | G06F 9/546 710/52 |
| 2008/0147945 A1 | * | 6/2008 | Zimmer | G06F 9/4411 710/260 |
| 2009/0292810 A1 | * | 11/2009 | Hotta | G06F 9/546 709/226 |
| 2013/0139030 A1 | * | 5/2013 | Okubo | G06F 11/1048 714/755 |
| 2014/0003167 A1 | * | 1/2014 | Jung | G11C 7/00 365/189.14 |

* cited by examiner

*Primary Examiner* — Tim T Vo
*Assistant Examiner* — Phong H Dang
(74) *Attorney, Agent, or Firm* — IP & T Group LLP (57) ABSTRACT A controller includes a descriptor identifier (ID) management block suitable for allocating or deallocating a descriptor ID; a control unit suitable for generating a descriptor corresponding to the descriptor ID, which is allocated by the descriptor ID management block; and an input/output unit suitable for processing a work based on the descriptor, wherein the input/output unit transfers a request for deallocating the descriptor ID to the descriptor ID management block when the work is normally processed.

13 Claims, 7 Drawing Sheets

CONTROLLER AND DATA STORAGE DEVICE INCLUDING THE SAME

CROSS-REFERENCES TO RELATED APPLICATION

The present application claims priority under 35 U.S.C. § 119(a) to Korean application number 10-2014-0041720, filed on Apr. 8, 2014, in the Korean Intellectual Property Office, which is incorporated herein by reference in its entirety.

BACKGROUND

1. Technical Field

Various embodiments relate to a data storage device, and more particularly, to a controller, which processes a work by using a descriptor, and a data storage device including the same.

2. Related Art

Recently, the paradigm for the computer environment has been converted into ubiquitous computing so that computer systems can be used anytime and anywhere. Due to this fact, the use of portable electronic devices such as mobile phones, digital cameras, and notebook computers has rapidly increased. In general, such portable electronic devices use a data storage device including a memory device. The data storage device stores data used in the portable electronic devices.

A data storage device including a memory device provides advantages in that, since there are no moving parts, stability and durability are excellent, and information access speed is high and power consumption is small. Data storage devices having such advantages include universal serial bus (USB) memory devices, memory cards having various interfaces, universal flash storage (UFS) devices, and solid state drives (SSD).

SUMMARY

A controller including a block for managing an identifier of a descriptor according to a processing state of the descriptor and a data storage device including the same are described herein.

In an embodiment of the present disclosure, a controller may include: a descriptor identifier (ID) management block suitable, for allocating or deallocating a descriptor ID; a control unit suitable for generating a descriptor corresponding to the descriptor ID, which is allocated by the descriptor ID management block; and an input/output unit suitable for processing a work based on the descriptor, wherein the input/output unit transfers a request for deallocating the descriptor ID to the descriptor ID management block when the work is normally processed.

In an embodiment, the control unit may perform an error handling to the work when the work is abnormally processed, and then transfer a request for deallocating the descriptor ID to the descriptor ID management block.

In an embodiment of the present disclosure, a data storage device may include: a nonvolatile memory device; a descriptor identifier (ID) management block suitable for allocating or deallocating a descriptor ID of a descriptor, which describes a work for controlling the nonvolatile memory device; a control unit suitable for generating the descriptor corresponding to the descriptor ID, which is allocated by the descriptor ID management block; and a memory interface unit suitable for processing the work based on the descriptor, wherein the memory interface unit transfers a request for deallocating the descriptor ID to the descriptor ID management block when the work is normally completed.

In the embodiment, the control unit may perform an error handling to the work when the work is abnormally completed, and then transfers a request for deallocating the descriptor ID to the descriptor ID management block.

In an embodiment of the present disclosure, a controller for controlling a target device may comprise: a memory unit suitable for allocating or deallocating a memory space therein; a control unit suitable for generating a descriptor to be stored in the allocated memory space; and a work unit suitable for performing a work for controlling the target device in response to the stored descriptor, wherein the memory unit deallocates the allocated memory space in response to a request of the work unit when the work is successfully completed.

In the embodiment, the memory unit may deallocate the allocated memory space in response to a request of the control unit after the control unit performs a post-process to the work when the work is unsuccessfully completed.

In an embodiment of the present disclosure, a method of operating a controller for controlling a target device may comprise: at a memory unit, allocating a memory space; at a control unit, generating and storing a descriptor in the allocated memory space; at a work unit, performing a work for controlling the target device in response to the stored descriptor; at the work unit, requesting deallocation of the allocated memory space when the work is successfully completed; and at the memory unit, deallocating the allocated memory space in response to the request of the work unit.

In the embodiment, the method may further comprise: at the control unit, performing a post-process to the work when the work is unsuccessfully completed; at the control unit, requesting deallocation of the allocated memory space after the post-process; and at the memory unit, deallocating the allocated memory space in response to the request of the control unit.

According to the embodiments of the present disclosure, since a block for managing an identifier of a descriptor according to success or failure of a work corresponding to the descriptor is included in a controller, the operation speeds of the controller and a data storage device including the same may be improved.

BRIEF DESCRIPTION OF THE DRAWINGS

Features, aspects, and embodiments are described in conjunction with the attached drawings, in which.

DETAILED DESCRIPTION

In the present invention, advantages, features and methods for achieving them will become apparent after reading of the following exemplary embodiments taken in conjunction with the drawings. The present invention may, however, be embodied in different forms and should not be construed as being limited to the embodiments set forth herein. Rather, these embodiments are provided to describe the present invention in detail to the extent that a person skilled in the art to which the invention pertains can apply the concept of the present invention.

It is to be understood herein that embodiments of the present invention are not limited to the particulars shown in the drawings and that the drawings are not necessarily to scale and in some instances proportions may have been exaggerated in order to more clearly depict certain features of the invention. While particular terminology is used, it is to be appreciated that the terminology used herein is for the purpose of describing particular embodiments only and is not intended to limit the scope of the present invention.

In this document, the term "and/or" includes any and all combinations of one or more of the associated listed items. It will be understood that when an element is referred to as being "on," "connected to" or "coupled to" another element, it may be directly on, connected, or coupled to the other element, or intervening elements may be present. As used herein, a singular form is intended to include plural forms as well, and vice versa, unless the context clearly indicates otherwise. It will be further understood that the terms "includes" and/or "including," when used in this specification, specify the presence of at least one stated feature, step, operation, and/or element, but do not preclude the presence or addition of one or more other features, steps, operations, and/or elements thereof.

A controller and a data storage device including the same according to the present disclosure will be described below with reference to the accompanying drawings through exemplary embodiments.

Figure 1:
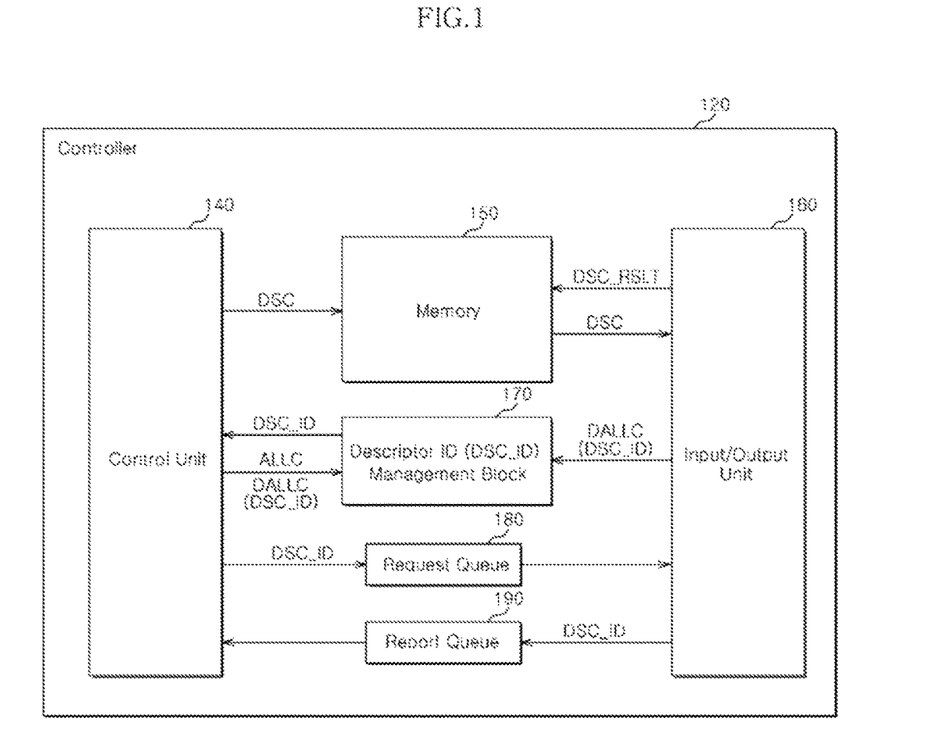
FIG. 1 is a block diagram exemplarily illustrating a controller in accordance with an embodiment of the present disclosure.
Figure 2:
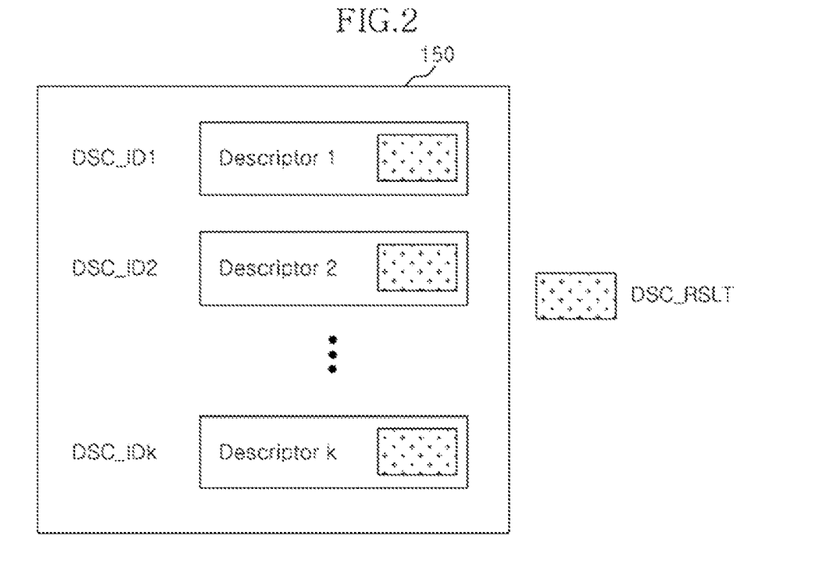
FIG. 2 is a diagram illustrating descriptors and identifiers of the descriptors in accordance with an embodiment of the present disclosure.

FIG. 1 is a block diagram exemplarily illustrating a controller in accordance with an embodiment of the present disclosure. FIG. 2 is a diagram illustrating descriptors and identifiers of the descriptors in accordance with the embodiment of the present disclosure. The controller 120, which processes a work by using a descriptor DSC, will be described in detail with reference to FIGS. 1 and 2. The descriptor DSC may mean a work order representing a work to be processed by an input/output unit 160 to control a control target device (not shown) subject to the control of the controller 120.

Referring to FIG. 1 the controller 120 may include a control unit 140, a memory 150, the input/output unit 160, a descriptor identifier (ID) management block 170, a request queue 180, and a report queue 190. The memory 150 may be volatile.

The descriptor ID management block 170 may manage a descriptor ID DSC_ID. For example, the descriptor ID management block 170 may allocate or deallocate the descriptor ID DSC_ID. The memory 150 may store a descriptor DSC corresponding to the descriptor ID DSC_ID.

The control unit 140 may request the descriptor ID DSC_ID to the descriptor ID management block 170 (ALLC). Upon receiving the descriptor ID DSC_ID from the descriptor ID management block 170, the control unit 140 may generate a descriptor DSC corresponding to the received descriptor ID DSC_ID, which is allocated by the descriptor ID management block 170, and store the descriptor DSC into the memory 150 according to the received descriptor ID DSC_ID.

As shown in FIG. 2, the descriptor ID DSC_ID may correspond to the descriptor DSC, which is generated by the control unit 140 and stored in the memory 150. The descriptor ID DSC_ID may be address information of the descriptor DSC stored in the memory 150.

The control unit 140 may enqueue the descriptor ID DSC_ID corresponding to the generated descriptor DSC in the request queue 180. That is to say, the control unit 140 may instruct the input/output unit 160 to process a work designated by the descriptor DSC stored in the memory 150 and identified by the descriptor ID DSC_ID in the request queue 180.

The input/output unit 160 may process the work designated by the descriptor DSC stored in the memory 150, which is identified through the descriptor ID DSC_ID enqueued in the request queue 180.

The work, which the input/output unit 160 may process according to the descriptor DSC stored in the memory 150, may be to control the control target device. For instance, based on the descriptor DSC stored in the memory 150, the input/output unit 160 may generate and output a signal for controlling the control target device. Also, the input/output unit 160 may generate and output a data signal to be provided to the control target device. For another instance, the input/output unit 160 may process a response signal inputted from the control target device. The response signal may be a control result of the control target device or result data processed by the control target device.

After completion of the work corresponding to the enqueued descriptor ID DSC_ID in the request queue 180, the input/output unit 160 may generate and store a result flag DSC_RSLT, which may represent success or failure of the work designated by the descriptor DSC, in the memory 150 based on the response signal from the control target device. In other words, the descriptor DSC may include a field for the result flag DSC_RSLT as shown in FIG. 2, and the input/output unit 160 may indicate the success or failure of the work through the result flag DSC_RSLT whenever the work designated by the descriptor DSC is completed successfully or unsuccessfully. Through the result flag DSC_RSLT, the input/output unit 160 may report, to the control unit 140, success or failure of the work corresponding to the enqueued descriptor ID DSC_ID in the request queue 180.

Also, the input/output unit 160 may enqueue the descriptor ID DSC_ID corresponding to the completed work in the report queue 190. Namely, the input/output unit 160 may report, to the control unit 140, completion of the work corresponding to the enqueued descriptor ID DSC_ID in the request queue 180, by enqueuing the descriptor ID DSC_ID corresponding to the completed work in the report queue 190.

When the work, which is designated by the descriptor DSC corresponding to the descriptor ID DSC_ID enqueued in the request queue 180 is successfully completed, the input/output unit 160 may request the descriptor ID management block 170 to deallocate the descriptor ID DSC_ID corresponding to the successfully completed work (DALLC). Upon receiving the request from the input/output unit 160, the descriptor ID management block 170 may deallocate the requested descriptor ID DSC_ID.

The control unit 140 may check the result flag DSC_RSLT included in the descriptor DSC corresponding to the descriptor ID DSC_ID enqueued in the report queue 190. By checking the result flag DSC_RSLT of the descriptor DSC, which corresponds to the completed work and the description ID DSC_ID enqueued in the report queue 190, the control unit 140 may identify the completed work as a success (that is, the operation of the control target device has been normally completed) or failure (that is, the operation of the control target device has been abnormally completed).

When the work, which is designated by the descriptor DSC corresponding to the descriptor ID DSC_ID enqueued in the request queue 180 is unsuccessfully completed, the control unit 140 may perform a post-process, for example, an error handling process for the abnormally completed work. After such post-process is completed, the control unit 140 may request the descriptor ID management block 170 to deallocate the descriptor ID corresponding to the post-processed work (DALLC). Upon receiving the request from the control unit 140, the descriptor ID management block 170 may deallocate the requested descriptor ID DSC_ID.

According to an embodiment of the present disclosure, instead of the control unit 140, the descriptor ID management block 170 may manage, that is, deallocate the descriptor ID DSC_ID corresponding to the descriptor DSC of the successfully completed work in response to the request from the input/output unit 160. Therefore, the control unit 140 may save a source for managing the descriptor DSC of the successfully completed work. This means that operation speed of the controller 120 may be unproved.

Figure 3:
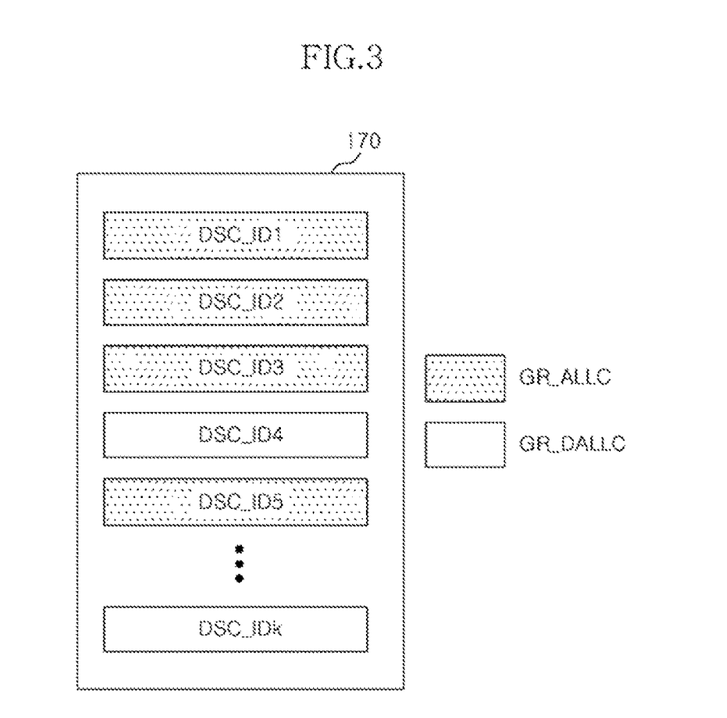
FIG. 3 is a diagram illustrating an operation of a descriptor ID management block in accordance with an embodiment of the present disclosure.

FIG. 3 is a diagram illustrating an operation of the descriptor ID management block 170 in accordance with an embodiment of the present disclosure. As described above, the descriptor ID management block 170 may manage the descriptor ID DSC_ID by allocating or deallocating the descriptor ID DSC_ID.

The descriptor ID management block 170 may categorize each descriptor ID DSC_ID into one of an allocated group GR_ALLC and a deallocated group GR_DALLC according to the allocation status of the descriptor ID DSC_ID. For example, the descriptor ID management block 170 may categorize the descriptor IDs DSC_ID1, DSC_ID2, DSC_ID3 and DSC_ID5, which are currently allocated, into the allocated group GR_ALLC. For another example, the descriptor ID management block 170 may categorize the descriptor IDs DSC_ID4 and DSC_IDk, which are currently deallocated, into the unallocated group GR_DALLC.

When the control unit 140 requests the descriptor ID DSC_ID, the descriptor ID management block 170 may allocate the descriptor ID DSC_ID by selecting one of the descriptor IDs included in the deallocated group GR_DALLC, categorizing the selected descriptor ID DSC_ID into the allocated group GR_ALLC, and providing the selected descriptor ID DSC_ID as the allocated descriptor ID DSC_ID to the control unit 140.

Figure 4:
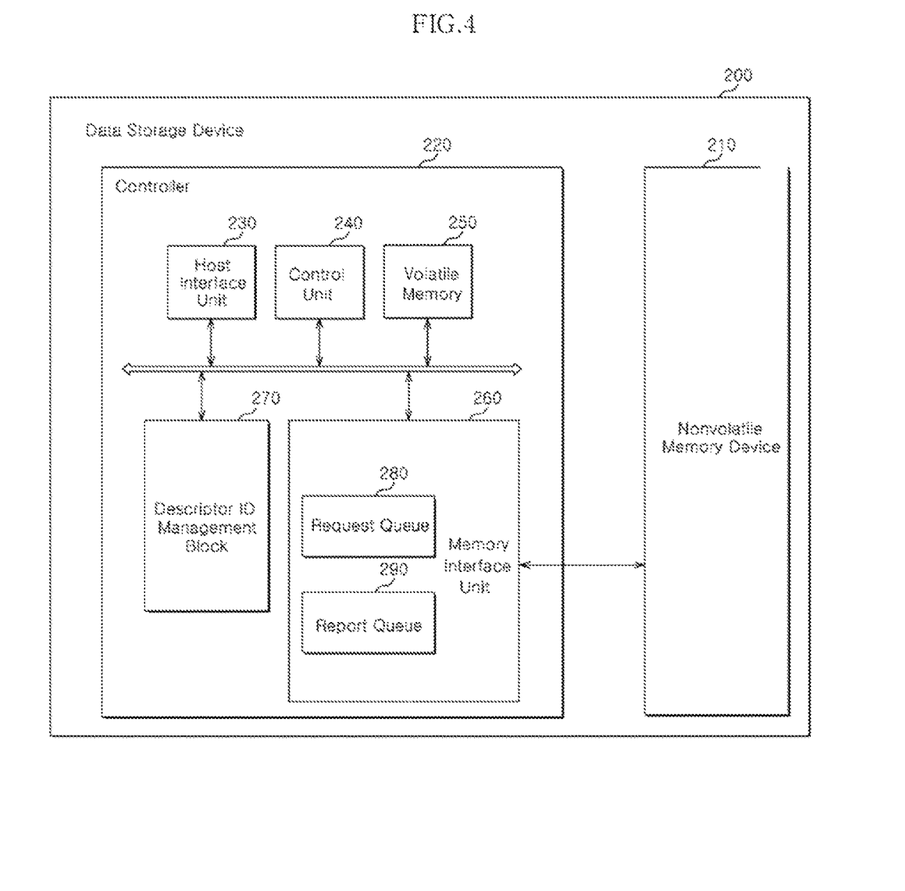
FIG. 4 is a block diagram exemplarily illustrating a data storage device in accordance an embodiment of the present disclosure.

FIG. 4 is a block diagram exemplarily illustrating a data storage device in accordance an embodiment of the present disclosure.

A data storage device 200 may store data to be accessed by a host device (not shown) such as a mobile phone, an MP3 player, a laptop computer, a desktop computer, a game player, a TV, an in-vehicle infotainment system, and so forth. The data storage device 200 may also be referred to as a memory system.

The data storage device 200 may be manufactured as any one of various kinds of storage devices according to the protocol of an interface which is electrically coupled with the host device. For example, the data storage device 200 may be configured as any one of various kinds of storage devices such as a solid state drive, a multimedia card in the form of an MMC, an eMMC, an RS-MMC and a micro-MMC, a secure digital card in the form of an SD, a mini-SD and a micro-SD, a universal serial bus (USB) storage device, a universal flash storage (UFS) device, a personal computer memory card international association (PCMCIA) card type storage device, a peripheral component interconnection (PCI) card type storage device, a PCI express (PCI-E) card type storage device, a compact flash (CF) card, a smart media card, a memory stick, and so forth.

The data storage device 200 may be manufactured as any one of various kinds of package types. For example, the data storage device 200 may be manufactured as any one of various kinds of package types such as a package-on-package (POP), a system-in-package (SIP), a system-on-chip (SOC) a multi-chip package (MCP), a chip-on-board (COB), a wafer-level fabricated package (FP) and a wafer-level stack package (WSP).

The data storage device 200 may include a nonvolatile memory device 210 and a controller 220.

The nonvolatile memory device 210 may operate as the storage medium of the data storage device 200. The nonvolatile memory device 210 may be constituted by any one of various types of nonvolatile memory devices such as a NAND flash memory device, a NOR flash memory device, a ferroelectric random access memory (FRAM) using a ferroelectric capacitor, a magnetic random access memory (MRAM) using a tunneling magneto-resistive (TMR) layer, a phase change random access memory (PCRAM) using a chalcogenide alloy, and a resistive random access memory (RERAM) using a transition metal oxide. The FRAM, the MRAM, the PCRAM and the RERAM are kinds of nonvolatile random access memory devices capable of random access to memory cells. The nonvolatile memory device 210 may be constituted by a combination of a NAND type flash memory device and one or more of the various types of nonvolatile random access memory devices described above.

The controller 220 may control the general operations of the data storage device 200 through driving of the firmware or the software loaded on a volatile memory 250 which is disposed in the controller 220. The controller 220 may decode or drive a code type instruction or algorithm such as firmware or software. The controller 220 may be realized in hardware or in a combination of hardware and software.

The controller 220 may include a host interface unit 230, a control unit 240, the nonvolatile memory 250, a memory interface unit 260, and a descriptor ID management block 270. The memory interface unit 260 may include a request queue 280 and a report queue 290. The control unit 240, the volatile memory 250, the memory interface unit 260, the descriptor ID management block 270, the request queue 280 and the report queue 290 may be configured in the same way and perform the same operations as the control unit 140, the volatile memory 150, the input/output unit 160, the descriptor ID management block 170, the request queue 180 and the report queue 190, respectively, shown in FIG. 1.

The host interface unit 230 may interface the host device and the data storage device 200 corresponding to the protocol of the host device. For instance, the host interface unit 230 may communicate with the host device through any one of a universal serial bus (USB) protocol, a universal flash storage (UFS) protocol, a multimedia card (MMC) protocol, a parallel advanced technology attachment (PATA) protocol, a serial advanced technology attachment (SATA) protocol, a small computer system interface (SCSI) protocol, a serial attached SCSI (SAS) protocol, a peripheral component interconnection (PCI) protocol, and a PCI express (PCI-E) protocol.

The control unit 240 may analyze and process the request which is inputted from the host device. The control unit 240 may control the general operations of the controller 220 in response to the request of the host device. The control unit 240 may control the operations of the function blocks disposed in the controller 220, according to firmware or software for driving the data storage device 200.

The volatile memory 250 may store firmware or software to be driven by the control unit 240. Also, the volatile memory 250 may be configured to store data necessary to drive the firmware or the software. That is to say, the volatile memory 250 may operate as the working memory of the control unit 240. The volatile memory 250 may be configured to temporarily store data to be transmitted from the host device to the nonvolatile memory device 210 or from the nonvolatile memory device 210 to the host device. Namely, the volatile memory 250 may operate as a data buffer memory.

The control unit 240, the volatile memory 250, the memory interface unit 250, the descriptor ID management block 270, the request queue 280, and the report queue 290 shown in FIG. 4 may correspond to the control unit 140, the memory 150, the input/output unit 150, the descriptor ID management block 170, the request queue 180, and the report queue 190 described above with reference to FIGS. 1 to 3, respectively.

The descriptor ID management block 270 may manage the descriptor ID. For example, the descriptor ID management block 270 may allocate or deallocate the descriptor ID. The volatile memory 250 may store the descriptor corresponding to the descriptor ID.

The control unit 240 may request the descriptor ID to the descriptor ID management block 270. Upon receiving the descriptor ID from the descriptor ID management block 270, the control unit 240 may generate the descriptor corresponding to the received descriptor ID, which is allocated by the descriptor ID management block 270, and store the descriptor into the volatile memory 250 according to the received descriptor ID.

The control unit 240 may enqueue the descriptor ID corresponding to the generated descriptor in the request queue 280. That is to say, the control unit 240 may instruct the memory interface unit 260 to process a work designated by the descriptor stored in the volatile memory 250 and identified by the descriptor ID in the request queue 280.

The memory interface unit 260 may process the work designated by the descriptor stored in the volatile memory 250, which is identified through the descriptor ID enqueued in the request queue 280.

The work, which the memory interface unit 260 may process according to the descriptor stored in the volatile memory 250, may control the nonvolatile memory device 210. For instance, based on the descriptor stored in the volatile memory 250, the memory interface unit 260 may generate and output control signals to the nonvolatile memory device 210. The control signals may include a command and an address signal for controlling the nonvolatile memory device 210. Further, based on the descriptor stored in the volatile memory 250, the memory interface unit 260 may generate and output a data signal to the nonvolatile memory device 210. The memory interface unit 260 may receive and store a data signal, which is provided as a response from the nonvolatile memory device 210, in the volatile memory 250.

After completion of the work corresponding to the enqueued descriptor ID in the request queue 280, the memory interface unit 260 may generate and store the result flag, which may represent success or failure of the work designated by the descriptor, in the volatile memory 250 based on the response from the nonvolatile memory device 210. In other words, the descriptor may include the result flag as described above with reference to FIG. 2, and the memory interface unit 260 may indicate the success or failure of the work through the result flag whenever the work designated by the descriptor is completed successfully or unsuccessfully. Through the result flag, the memory interface unit 260 may report, to the control unit 240, success or failure of the work corresponding to the enqueued descriptor ID in the request queue 280. Also, the memory interface unit 260 may enqueue the descriptor ID corresponding to the completed work in the report queue 290. Namely, the memory interface unit 260 may report, to the control unit 240, completion of the work corresponding to the enqueued descriptor ID in the request queue 280, by enqueuing the descriptor ID corresponding to the completed work in the report queue 290.

When the work, which is designated by the descriptor corresponding to the descriptor ID enqueued in the request queue 180, is successfully completed by the nonvolatile memory device 210 in response to the control signals provided by the memory interface unit 260, the memory interface unit 260 may request the descriptor ID management block 270 to deallocate the descriptor ID corresponding to the successfully completed work. Upon receiving the request from the memory interface unit 260, the descriptor ID management block 270 may deallocate the requested descriptor ID.

The control unit 240 may check the result flag included in the descriptor corresponding to the descriptor ID enqueued in the report queue 290. By checking the result flag of the descriptor, which corresponds to the completed work and the description ID enqueued in the report queue 290, the control unit 240 may identify the completed work as a success (that is, the operation of the nonvolatile memory device 210 has been normally completed) or failure (that is, the operation of the nonvolatile memory device 210 has been abnormally completed).

When the work, which is designated by the descriptor corresponding to the descriptor ID enqueued in the request queue 280 is unsuccessfully completed, the control unit 240 may perform a post-process for the abnormally completed work, for example, an error handling work. After such post-process is completed, the control unit 240 may request the descriptor ID management block 270 to deallocate the descriptor ID corresponding to the post-processed work. Upon receiving the request from the control unit 240, the descriptor ID management block 270 may deallocate the requested descriptor ID.

Figure 5:
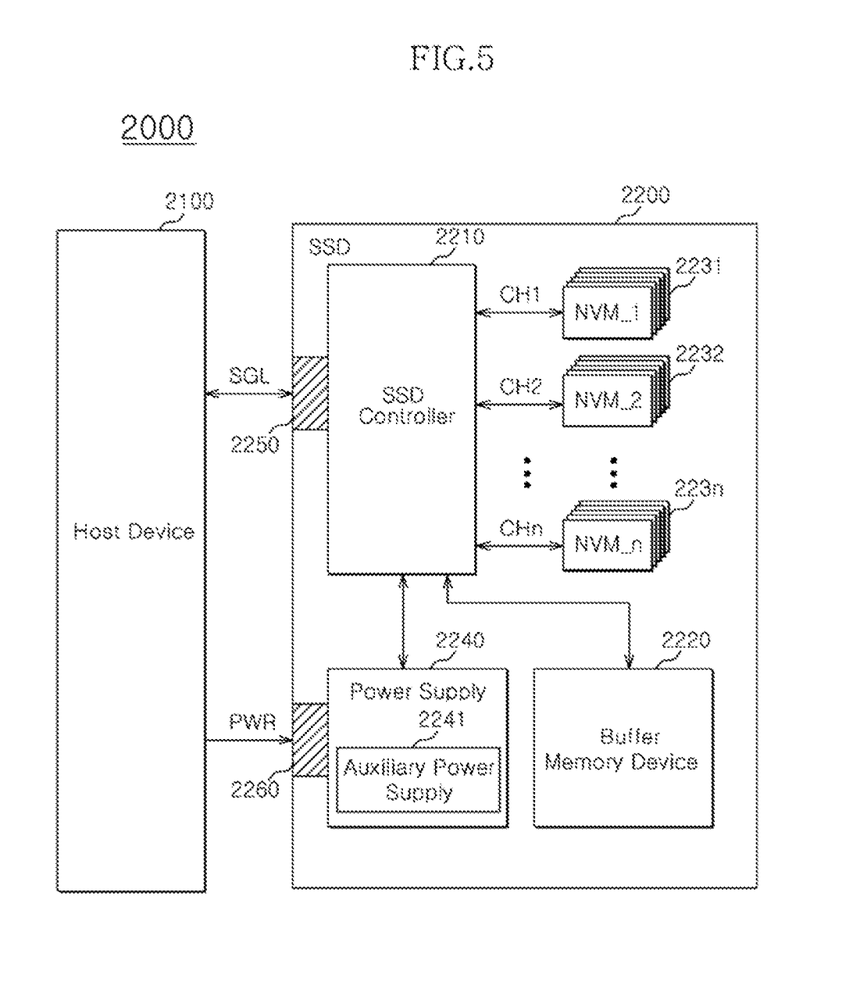
FIG. 5 is a block diagram exemplarily illustrating a data processing system including a solid state drive (SSD) in accordance with an embodiment of the present disclosure.

FIG. 5 is a block diagram exemplarily illustrating a data processing system including a solid state drive (SSD) in accordance with an embodiment of the present disclosure. Referring to FIG. 5, a data processing system 2000 may include a host device 2100 and a solid state drive (SSD) 2200.

The SSD 2200 may include an SSD controller 2210, the buffer memory device 2220, nonvolatile memory devices 2231 to 223n, a power supply 2240, a signal connector 2250, and a power connector 2260.

The SSD 2200 may operate in response to a request from the host device 2100. That is to say, the SSD controller 2210 may be configured to access the nonvolatile memory devices 2231 to 223n in response to a request from the host device 2100. For example, the SSD controller 2210 may be configured to control the read, program and erase operations of the nonvolatile memory devices 2231 to 223n.

The buffer memory device 2220 may be configured to temporarily store data in the nonvolatile memory devices 2231 to 223n. Further, the buffer memory device 2220 may be configured to temporarily store data which is read from the nonvolatile memory devices 2231 to 223n. The data temporarily stored in the buffer memory device 2220 may be transmitted to the host device 2100 or the nonvolatile memory devices 2231 to 223n under the control of the SSD controller 2210.

The nonvolatile memory devices 2231 to 223n may be used as storage media of the SSD 2200. The nonvolatile memory devices 2231 to 223n may be electrically coupled to the SSD controller 2210 through a plurality of channels CH1 to CHn, respectively. One or more nonvolatile memory devices may be electrically coupled to one channel. The nonvolatile memory devices electrically coupled to one channel may be electrically coupled to the same signal bus and data bus.

The power supply 2240 may be configured to provide power PWR inputted through the power connector 2260, to the inside of the SSD 2200. The power supply 2240 may include an auxiliary power supply 2241. The auxiliary power supply 2241 may be configured to supply power to allow the SSD 2200 to be normally terminated when a sudden power-off occurs. The auxiliary power supply 2241 may include super capacitors capable of being charged with power PWR.

The SSD controller 2210 may exchange a signal SGL with the host device 2100 through the signal connector 2250. The signal SGL may include a command, an address, data, and so forth. The signal connector 2250 may by constituted by a connector such as of parallel advanced technology attachment (DATA), serial advanced technology attachment (SATA), small computer system interface (SCSI), serial attached SCSI (SAS), peripheral component interconnection (PCI) and PCI express (PCI-E) protocols, according to the interface scheme between the host device 2100 and the SSD 2200.

Figure 6:
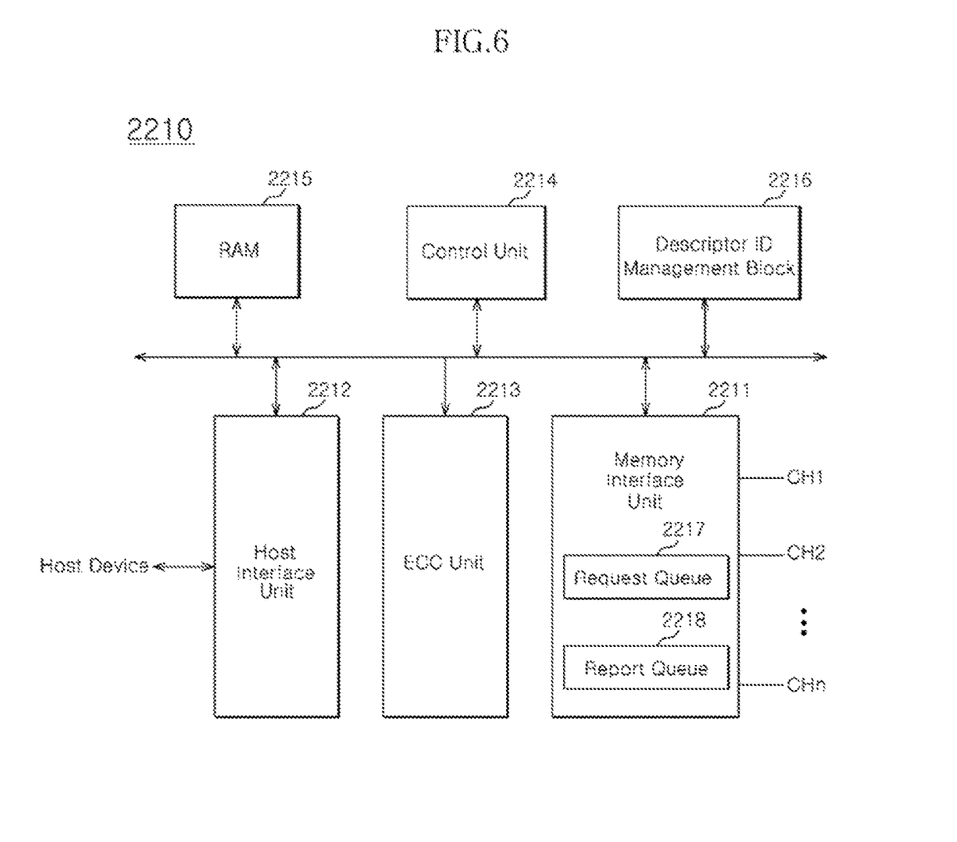
FIG. 6 is a block diagram exemplarily illustrating a SSD controller shown in FIG. 5.

FIG. 6 is a block diagram exemplarily illustrating the SSD controller 2210 shown in FIG. 5. Referring to FIG. 6, the SSD controller 2210 may include a memory interface unit 2211, a host interface unit 2212, an error correction code (ECC) unit 2213, a control unit 2214, a RAM 2215, and a descriptor ID management block 2216.

The control unit 2214, the RAM 2215, the memory interface unit 2211, the descriptor ID management block 2216, the request queue 2217 and the report queue 2218 shown in FIG. 4 may correspond to the control unit 140, the memory 150, the input/output unit 160, the descriptor ID management block 170, the request queue 180, and the report queue 190 described above with reference to FIGS. 1 to 3, respectively.

The descriptor ID management block 2211 may manage the descriptor ID. For example, the descriptor ID management block 2211 may allocate or deallocate the descriptor ID. The RAM 2215 may store the descriptor corresponding to the descriptor ID.

The control unit 2214 may request the descriptor ID from the descriptor ID management block 2211. Upon receiving the descriptor ID from the descriptor ID management block 2211, the control unit 2214 may generate the descriptor corresponding to the received descriptor ID, which is allocated by the descriptor ID management block 2211, and store the descriptor into the RAM 2215 according to the received descriptor ID.

The control unit 2214 may enqueue the descriptor ID corresponding to the generated descriptor in the request queue 2217. That is to say, the control unit 2214 may instruct the memory interface unit 2211 to process a work designated by the descriptor stored in the RAM 2215 and identified by the descriptor ID in the request queue 2217.

The memory interface unit 2211 may process the work designated by the descriptor stored in the RAM 2215, which is identified through the descriptor ID enqueued in the request queue 2217.

The work, which the memory interface unit 2211 may process according to the descriptor stored in the RAM 2215, may be to control the nonvolatile memory devices 2231 to 223n. For instance, based on the descriptor stored in the RAM 2215, the memory interface unit 2211 may provide control signals such as a command and an address to the nonvolatile memory devices 2231 to 223n. Further, based on the descriptor stored in the RAM 2215, the memory interface unit 2211 may exchange data with the nonvolatile memory devices 2231 to 223n.

After completion of the work corresponding to the enqueued descriptor ID in the request queue 2217, the memory interface unit 2211 may generate and store the result flag, which may represent success or failure of the work designated by the descriptor, in the RAM 2215 based on the response from the nonvolatile memory devices 2231 to 223n. In other words, the descriptor may include the result flag as described above with reference to FIG. 2, a id the memory interface unit 2217 may indicate the success or failure of the work through the result flag whenever the work designated by the descriptor is completed successfully or unsuccessfully. Through the result flag, the memory interface unit 2217 may report, to the control unit 2214, success or failure of the work corresponding to the enqueued descriptor ID in the request queue 2217. Also, the memory interface unit 2211 may enqueue the descriptor ID corresponding to the completed work in the report queue 2218. Namely, the memory interface unit 2211 may report, to the control unit 2214, completion of the work corresponding to the enqueued descriptor ID in the request queue 2217, by enqueuing the descriptor ID corresponding to the completed work in the report queue 2218. When the work, which is designated by the descriptor corresponding to the descriptor ID enqueued in the request queue 2217, is successfully completed by the nonvolatile memory devices 2231 to 223n in response to the control signals provided by the memory interface unit 2211, the memory interface unit 2211 may request the descriptor ID management block 2216 to deallocate the descriptor ID corresponding to the successfully completed work. Upon receiving the request from the memory interface unit 2211, the descriptor ID management block 2216 may deallocate the requested descriptor ID.

The control unit 2214 may check the result flag included in the descriptor corresponding to the descriptor ID enqueued in the report queue 2218. By checking the result flag of the descriptor, which corresponds to the completed work and the description ID enqueued in the report queue 2218, the control unit 2214 may identify the completed work as a success (that is, the operations of the nonvolatile memory devices 2231 to 223n have been normally completed) or failure (that is, the operations of the nonvolatile memory devices 2231 to 223n have been abnormally completed).

When the work, which is designated by the descriptor corresponding to the descriptor ID enqueued in the request queue 2218 is unsuccessfully completed, the control unit 2214 may perform a post-process for the abnormally completed work, for example, an error handling work. After such post-process is completed, the control unit 2214 may request the descriptor ID management block 2216 to deallocate the descriptor ID corresponding to the post-processed work. Upon receiving the request from the control unit 2214, the descriptor ID management block 2216 may deallocate the requested descriptor ID.

The host interface unit 2212 may provide an interface with the SSD 2200 corresponding to the protocol of the host device 2100. For example, the host interface unit 2212 may communicate with the host device 2100 through one of parallel advanced technology attachment (PATA), serial advanced technology attachment (SATA), small computer system interface (SCSI), serial attached SCSI (SAS), peripheral component interconnection (PCI) and PCI express (PCI-E) protocols. In addition, the host interface unit 2212 may perform a disk emulating function of supporting the host device 2100 to recognize the SSD 2200 as a hard disk drive (HDD).

The ECC unit 2213 may detect an error of the data read from the nonvolatile memory devices 2231 to 223n, based on the parity data generated for the data transmitted to the nonvolatile memory devices 2231 to 223n. If the detected error is within a correctable range, the ECC unit 2213 may correct the detected error. While it is exemplified in FIG. 6 that the ECC unit 2213 is configured outside the memory interface unit 2211, it is to be noted that the ECC unit 2213 may be included in the memory interface unit 2211.

The control unit 2214 may also be configured to analyze and process the signal SGL inputted from the host device 2100. To this end, the control unit 2214 may drive the firmware loaded on the RAM 2215.

Figure 7:
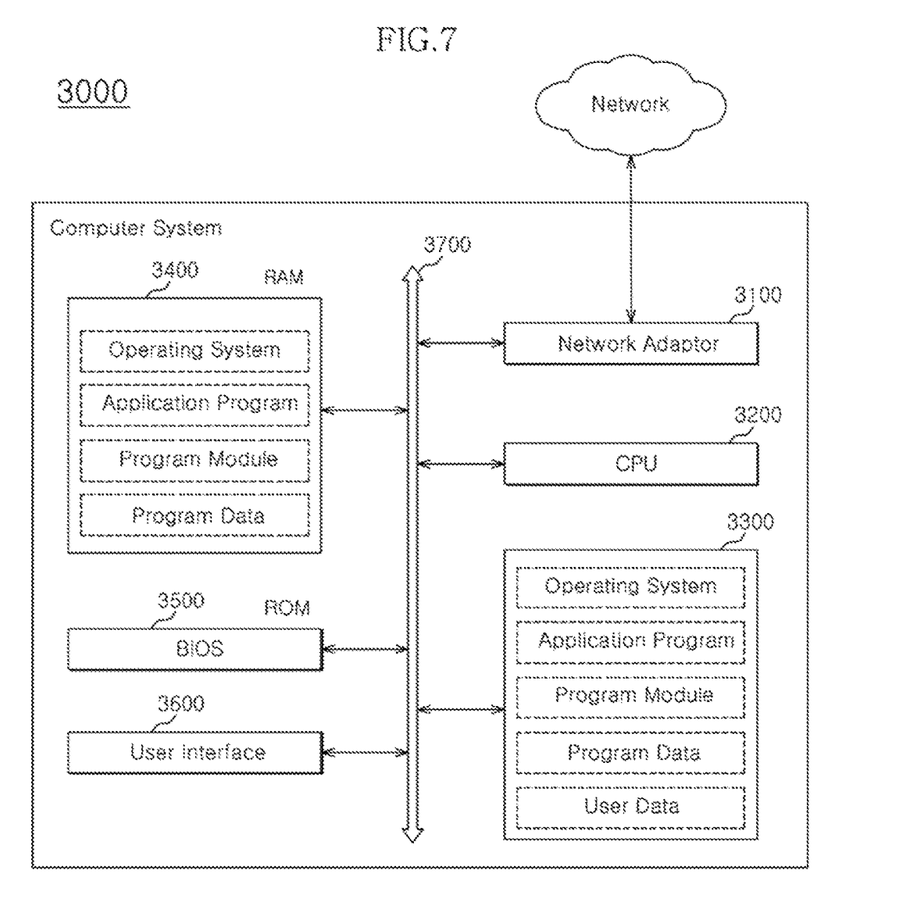
FIG. 7 is a block diagram exemplarily illustrating a computer system including a data storage device in accordance with an embodiment of the present disclosure.

FIG. 7 is a block diagram exemplarily illustrating a computer system including a data storage device in accordance with an embodiment of the present disclosure. Referring to FIG. 7, a computer system 3000 may include a network adaptor 3100, a central processing unit 3200, a data storage device 3300, a RAM 3400, a ROM 3500 and a user interface 3600, which are electrically coupled to a system bus 3700. The data storage device 3300 may be constituted by the data storage device 200 shown in FIG. 4 or the SSD 2200 shown in FIG. 5.

The network adaptor 3100 provides interfacing between the computer system 3000 and external networks. The central processing unit 3200 performs general operations for driving an operating system residing at the RAM 3400 or an application program.

The data storage device 3300 stores general data necessary in the computer system 3000. For example, an operating system, an application program, various program modules, program data and user data for driving the computer system 3000 are stored in the data storage device 3300.

The RAM 3400 may be used as a working memory device of the computer system 3000. Upon booting, the operating system, the application program, the various program modules and the program data necessary for driving programs, which are read from the data storage device 3300, are loaded on the RAM 3400. A basic input/output system (BIOS) which is activated before the operating system is driven is stored in the ROM 3500. Information exchange between the computer system 3000 and a user is implemented through the us interface 3600.

Figure 8:
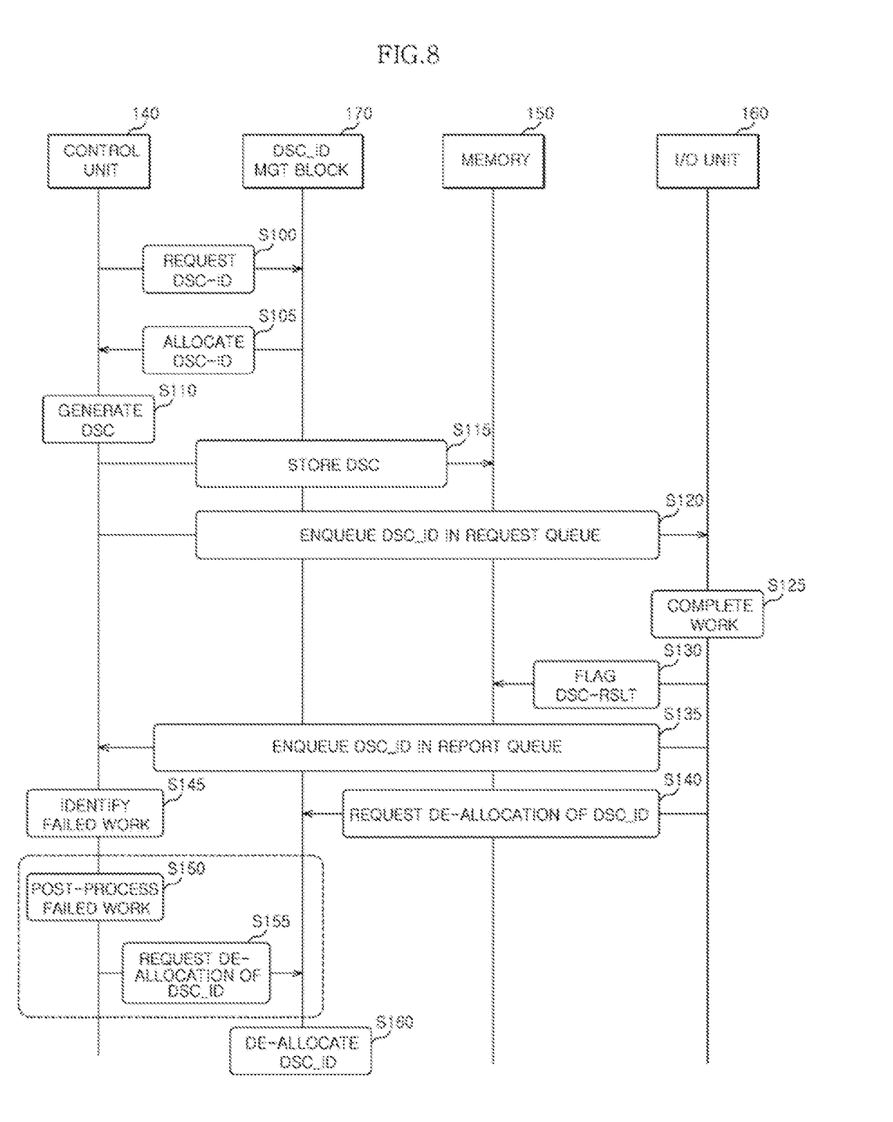
FIG. 8 is a transaction chart illustrating an operation of a controller shown in FIG. 1.

FIG. 8 is a transaction chart illustrating an operation of the controller 120 shown in FIG. 1.

Referring to FIG. 8, the control unit 140 may request the descriptor ID DSC_ID to the descriptor ID management block 170 (S100). Upon receiving the request from the control unit 140, the descriptor ID management block 170 may allocate and transmit the descriptor ID DSC_ID to the control unit 140 (S105).

Upon receiving the descriptor ID DSC_ID from the descriptor ID management block 170, the control unit 140 may generate the descriptor DSC corresponding to the received descriptor ID DSC_ID, which is allocated by the descriptor ID management block 170, and store the descriptor DSC into the memory 150 according to the received descriptor ID DSC_ID (S110 and S115). Also, the control unit 140 may enqueue the descriptor ID DSC_ID corresponding to the generated descriptor DSC in the request queue 180 (S120).

The input/output unit 160 may process the work designated by the descriptor DSC stored in the memory 150, which is identified through the descriptor ID DSC_ID enqueued in the request queue 180 (S125). After completion of the work corresponding to the enqueued descriptor ID DSC_ID in the request queue 180, the input/output unit 160 may generate and store the result flag DSC_RSLT in the memory 150 (S130). Also, the input/output unit 160 may enqueue the descriptor ID DSC—ID corresponding to the completed work in the report queue 190 (S135).

When the work, which is designated by the descriptor DSC corresponding to the descriptor ID DSC_ID enqueued in the request queue 180, is successfully completed, the input/output unit 160 may request the descriptor ID management block 170 to deallocate the descriptor ID DSC_ID corresponding to the successfully completed work (S140).

The control unit 140 may identify the completed work as a success or failure by checking the result flag DSC_RSLT of the descriptor DSC, which corresponds to the completed work and the description ID DSC_ID enqueued in the report queue 190 (S145). When the work, which is designated by the descriptor DSC corresponding to the descriptor ID DSC_ID enqueued in the request queue 180, is unsuccessfully completed, the control unit 140 may perform the post-process (S150). After such post-process is completed, the control unit 140 may request the descriptor ID management block 170 to deallocate the descriptor ID corresponding to the post-processed work (S155).

Upon receiving the request from the input/output unit 160 (S140) or from the control unit 140 (S155), the descriptor ID management block 170 may deallocate the requested descriptor ID DSC_ID (S160).

Although not shown in a drawing, the computer system 3000 may further include devices such as a battery, an application chipset, a camera image processor, and so forth.

While certain embodiments have been described above, it will be understood to those skilled in the art that the embodiments described are for example only. Accordingly, the controller and the data storage device including the same described herein should not be limited based on the described embodiments. Rather, the controller and the data storage device including the same described herein should only be limited in light of the claims that follow when taken in conjunction with the above description and accompanying drawings.

What is claimed is:

1. A controller comprising:
a memory storing a descriptor, wherein the descriptor describes a work for controlling a nonvolatile memory device;
a descriptor identifier (ID) management circuit allocating or deallocating a descriptor ID, wherein the descriptor ID is an address information of the memory where the descriptor is stored;
a control circuit generating the descriptor and storing the descriptor in an area of the memory corresponding to the descriptor ID, which is allocated by the descriptor ID management circuit; and
an input/output circuit processing the work based on the descriptor,
wherein the input/output circuit transfers a request for deallocating the descriptor ID to the descriptor ID management circuit when the work is normally processed, and
wherein the control circuit performs a post-process for the descriptor when the work is abnormally processed, and transfers a request for deallocating the descriptor ID to the descriptor ID management circuit when the post-process is completed.

2. The controller according to claim 1, wherein the input/output circuit generates a result flag in the descriptor representing normal or abnormal completion of the work whenever the work is completed.

3. The controller according to claim 2, wherein the control circuit identifies whether the work is normally or abnormally processed based on the result flag.

4. The controller according to claim 1, further comprising a request queue,
wherein the control circuit requests the input/output circuit to process the work by enqueuing the descriptor ID in the request queue.

5. The controller according to claim 4, wherein the input/output circuit identifies the descriptor stored in the memory based on the descriptor ID enqueued in the request queue.

6. The controller according to claim 4, further comprising a report queue,
wherein the input/output circuit reports completion of the work to the control circuit by enqueuing the descriptor ID in the report queue.

7. A data storage device comprising:
a nonvolatile memory device;
a volatile memory storing a descriptor, wherein the descriptor describes a work for controlling the nonvolatile memory device;
a descriptor identifier (ID) management circuit allocating or deallocating a descriptor ID, wherein the descriptor ID is an address information of the volatile memory where the descriptor is stored;
a control circuit generating the descriptor and storing the descriptor in an area of the volatile memory corresponding to the descriptor ID, which is allocated by the descriptor ID management circuit; and
a memory interface circuit processing the work based on the descriptor,
wherein the memory interface circuit transfers a request for deallocating the descriptor ID to the descriptor ID management circuit when the work is normally completed, and
wherein the control circuit performs a post-process for the descriptor when the work is abnormally processed, and transfers a request for deallocating the descriptor ID to the descriptor ID management circuit when the post-process is completed.

8. The data storage device according to claim 7, wherein the memory interface circuit generates a result flag in the descriptor representing normal or abnormal completion of the work whenever the work is completed.

9. The data storage device according to claim 8, wherein the control circuit identifies whether the work is normally or abnormally completed based on the result flag.

10. The data storage device according to claim 7, further comprising a request queue,
wherein the control circuit requests the memory interface circuit to process the work by enqueuing the descriptor ID in the request queue.

11. The data storage device according to claim 10, wherein the memory interface circuit identifies the descriptor stored in the volatile memory based on the descriptor ID enqueued in the request queue.

12. The data storage device according to claim 10, further comprising a report queue,
wherein the memory interface circuit reports completion of the work to the control circuit by enqueuing the descriptor ID in the report queue.

13. A controller for controlling a target device, comprising:
a memory storing a descriptor, wherein the descriptor describes a work for controlling the target device;
a management circuit allocating or deallocating an area of the memory where the descriptor is to be stored;
a control circuit generating the descriptor and storing the descriptor in the area of the memory, which is allocated by the management circuit; and
a work circuit performing a work for controlling the target device in response to the stored descriptor,
wherein the management circuit deallocates the allocated area in the memory in response to a request by the work circuit when the work is successfully completed, and deallocates the allocated area in the memory in response to a request of the control circuit after the control circuit performs a post-process to the work when the work is unsuccessfully completed.

* * * * *